(12) United States Patent
Shemer et al.

(10) Patent No.: US 10,503,610 B1
(45) Date of Patent: Dec. 10, 2019

(54) METHODS AND SYSTEMS FOR SOFTWARE PROTECTION WITHIN AN ISOLATED ENVIRONMENT

(71) Applicant: EMC IP Holding Company LLC, Hopkinton, MA (US)

(72) Inventors: Jehuda Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/724,010

(22) Filed: Oct. 3, 2017

(51) Int. Cl.
G06F 12/00 (2006.01)
G06F 11/14 (2006.01)
G06F 21/62 (2013.01)
G06F 21/78 (2013.01)
G06F 21/72 (2013.01)

(52) U.S. Cl.
CPC ...... *G06F 11/1464* (2013.01); *G06F 11/1453* (2013.01); *G06F 21/6218* (2013.01); *G06F 21/725* (2013.01); *G06F 21/78* (2013.01)

(58) Field of Classification Search
None
See application file for complete search history.

(56) References Cited

U.S. PATENT DOCUMENTS

2008/0133622 A1\* 6/2008 Brown ............... G06F 11/1458
2018/0145970 A1\* 5/2018 Agrawal ............ H04L 63/0823

\* cited by examiner

*Primary Examiner* — Daniel D Tsui
(74) *Attorney, Agent, or Firm* — Womble Bond Dickinson (US) LLP (57) ABSTRACT

According to some embodiments, an isolated storage system determines whether a secure network has been activated for data backup or data replication of a storage system. In response to determining that the secure network has been activated, the isolated storage system instantiates an instance of a backup software to perform the data backup or data replication of the storage system. The isolated storage system performs the data backup or data replication of the storage system via the instance of the backup software.

18 Claims, 6 Drawing Sheets

METHODS AND SYSTEMS FOR SOFTWARE PROTECTION WITHIN AN ISOLATED ENVIRONMENT

FIELD OF THE INVENTION

Embodiments of the present invention relate generally to data storage systems. More particularly, embodiments of the invention relate to methods and systems for software protection within an isolated environment.

BACKGROUND

In recent years, cyber-attacks are on the rise. The number of corporate breaches is growing exponentially and is led by hacking and malware. Generally, the entry point for many attackers (or hackers) is via end-user devices (e.g., a personal computer, smartphone, tablet, etc.) that are inherently vulnerable. Once an organization is infiltrated, data is usually compromised within days if not hours. The likelihood that the breach will be discovered within that time period is slim. This inability to detect an intruder gives attackers time to not only expose confidential information, but also destroy critical data.

Today, attackers are introducing more sophisticated attacks, for example advanced persistent threat (APT), in which an attacker may gain access to an organization's network and stay there undetected for a lengthy period of time, while the organization is trying to set a higher level of security countermeasures. Such attackers may seek to find a vulnerability of the organization to begin their attack and to gain reconnaissance.

To ensure the integrity of the data in an event of a cyber-attack, an isolated recovery solution (IRS) has been introduced. The IRS includes a backup storage system, which stores one or more protected copies of an organization's data, situated within an isolated environment. While the IRS may increase the protection of the data copies, it assumes that the software running on the backup storage system is uncompromised.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Generally, if backup software within the IRS backup/replication system is compromised, the data integrity of the data copies may be lost. For example, a coordinated attack may be accomplished to insert a malware or ransomware in the backup software. While present implementations attempt to prevent an attack by securing the IRS backup/replication system (e.g., using firewalls, penetration tests, vulnerability scans, etc.), the protocols utilized by such implementations, however, may be complex, and create a direct connection between a production backup system (which may be compromised) and the IRS backup/replication system.

In most deployments of IRS there is backup software running in production and the same software (which may be the same version) may also run in the IRS. These software instances may connect to each other when a secure network (e.g., air gap) closes in order to transfer backup data to the IRS. Additionally, they may run and connect to each other on multiple occasions over a period of time.

According to one aspect of the invention, an isolated storage system determines whether a secure network has been activated for data backup or data replication of a storage system. In response to determining that the secure network has been activated, the isolated storage system instantiates an instance of a backup software to perform the data backup or data replication of the storage system. The isolated storage system performs the data backup or data replication of the storage system via the instance of the backup software.

According to another aspect of the invention, the isolated storage system determines whether the secure network has been deactivated. The isolated storage system destroys the instance of the backup software in response to determining that the secure network has been deactivated.

Figure 1:
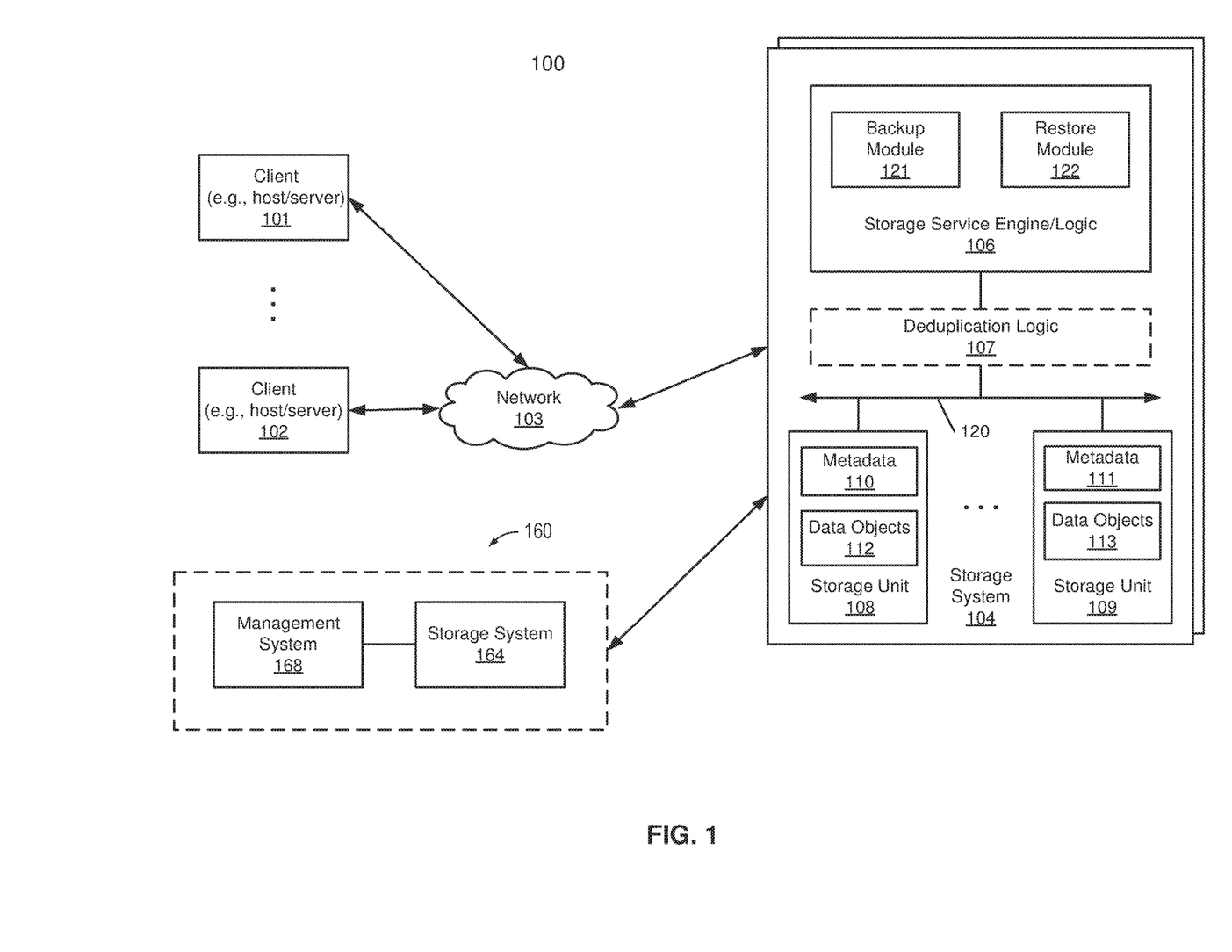
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. As discussed in more detail herein below, backup logic 121 may also be configured to communicate with another backup software or logic to transfer the backup data to another storage system for generating one or more protected copies of the backup data. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

As further shown in FIG. 1, system 100 may further include a data isolation system 160 communicatively coupled to storage system 104. In one embodiment, data isolation system 160 may be communicatively coupled to storage system 104, for example via a secure network connection (e.g., air gap). An air gap is a network security measure employed to one or more systems to ensure that a secure network is physically isolated from other networks, for example unsecured networks, such as the public Internet or an unsecured LAN.

In one embodiment, data isolation system 160 may include a storage system 164 and a management system 168. Storage system 164 may include or represent any type of servers or a cluster of one or more servers. For example, storage system 164 may be an isolated storage server that may include a replicator used for different purposes, such as to securely back up data (e.g., mission critical data) from and/or restore data to a storage server (e.g., storage system 104) for data recovery. In some embodiments, storage system 164 may provide storage services to one or more storage servers (e.g., storage system 104) via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 164 may further provide storage services via an object-based protocol and Hadoop distributed file system (HDFS) protocol.

In one embodiment, storage system 164 may further include a storage manager or storage controller (not shown) configured to manage storage resources of storage system 164, such as, for example, storage space and processing resources (e.g., processor, memory, network resources). The storage manager or controller may be accessed by an administrator of management system 168 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

In some embodiments, the administrator may configure management system 168 to only allow access of storage system 164 and/or management system 168 to authorized individuals, and perform security measures, such as disabling or locking down storage system 164 and/or management system 168, when security is compromised (or breached). In some embodiments, the administrator via management system 168 may schedule performance of replication routines to ensure data are transferred or copied from one or more storage servers (e.g., storage system 104) to storage system 164 in specified intervals depending on storage requirements of the storage system 164. Although not shown in FIG. 1, in some embodiments, data isolation system 160 may include a backup or replication software (or logic) that communicates with backup logic 121 of storage system 104 to transfer backup data from storage system 104 to data isolation system 160 for generating one or more protected copies of the data. The backup or replication software, for example, may run on storage system 164 and/or management system 168.

Figure 2:
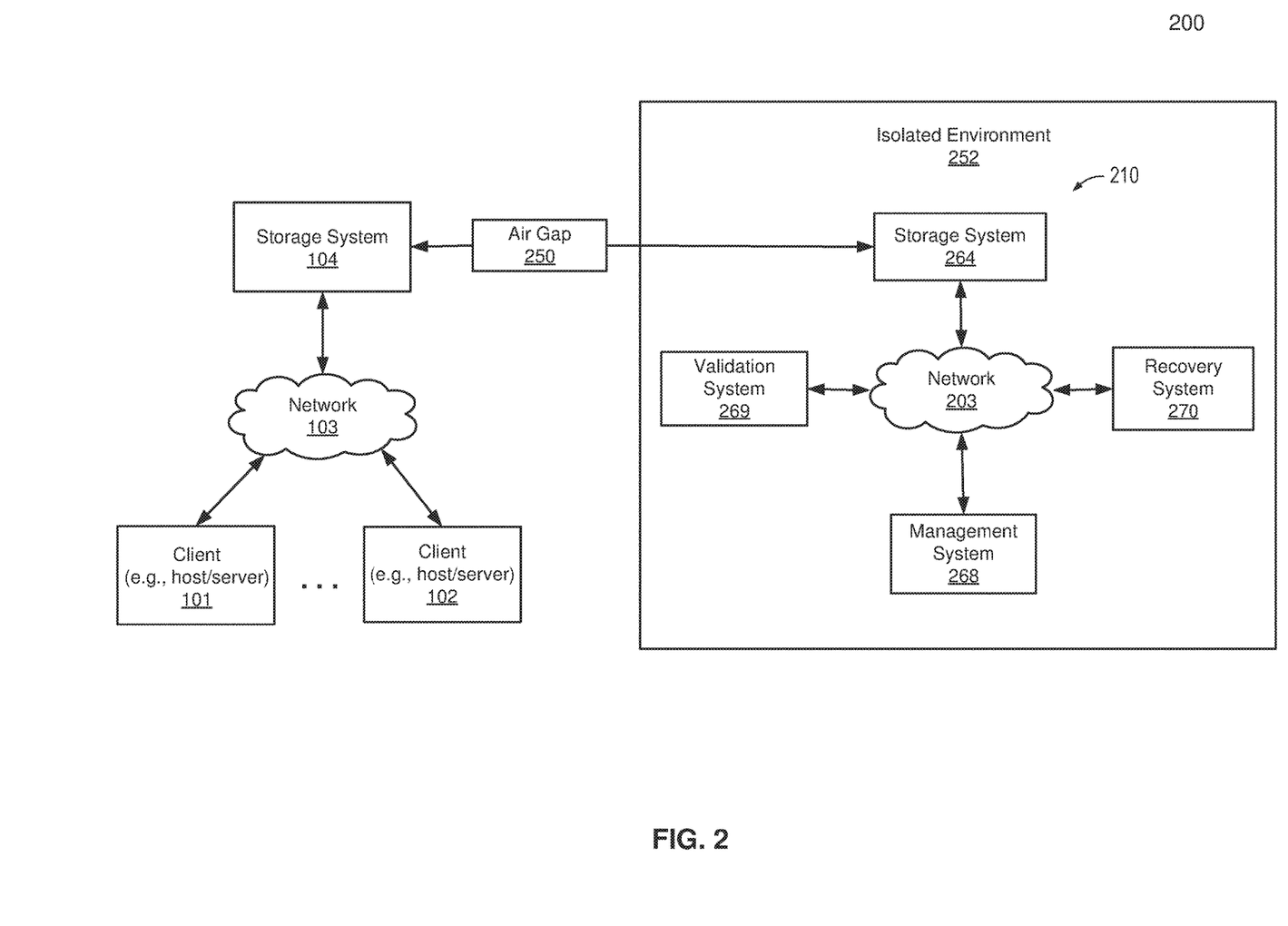
FIG. 2 is a block diagram illustrating another storage system with an isolated environment according to one embodiment of the invention.

FIG. 2 is a block diagram illustrating another storage system with an isolated environment according to one embodiment of the invention. Referring to FIG. 2, system 200 includes, but is not limited to, one or more client systems 101-102 communicatively coupled to storage system 104 over network 103 (which are previously described with respect to FIG. 1), and for brevity sake, are not described again. Additionally, system 200 includes data isolation system 210, which may be situated within isolated environment 252 (e.g., a safe room or vault). Generally, isolated environment 252 is protected by security devices (e.g., surveillance camera, motion detector, beam sensor, glass break sensor, access control system, etc.) and access to isolated environment 252 is only provided to authorized individuals. In some embodiments, data isolation system 210 may include storage system 264 communicatively coupled to management system 268, validation system 269, and recovery system 270 via network 203. Network 203 may be any type of networks such as a LAN, a fiber network, a storage network, or a combination thereof, wired or wireless. Generally, network 203 is a LAN within the isolated environment 252 and does not expose access to storage system 104 and clients 101-102.

In some embodiments, storage system 264 may be similar to or the same as storage system 164 of FIG. 1. Accordingly, storage system 264 may include or represent any type of servers or a cluster of one or more servers. For example, storage system 264 may be an isolated storage server used for different purposes, such as to back up data (e.g., mission critical data) from and/or restore data to storage system 104 for data recovery. In some embodiments, storage system 264 may include a replicator that securely, and asynchronously in some embodiments, replicates an original file system (e.g., file system stored on storage system 104) on a replicated file system (which may be stored on storage system 264). To perform file replication, the replicator may create, delete or modify files on the replicated file system. In some embodiments, storage system 104 can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs. In some embodiments the replicator may perform the backup/replication on block devices rather than at the file system level.

In some embodiments, data segments included in the original file system are copied to the replicated file system via removable storage media and initialization is completed via the network. The replicator may update changes to the original file system on the replicated file system, keeping the two file systems synchronized. The replicator may be implemented as a process and/or device separate from the storage systems 104 and 264 and/or file systems, a process and/or device that is a part of one or both of the storage systems and/or file system, or any other appropriate means. For example, in some embodiments, the replicator is a stand-alone device (e.g., replication server) capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

In some embodiments, management system 268, validation system 301, and recovery system 305 may represent a desktop, a laptop, a tablet, any type of hosts or servers, a mobile phone, a media player, a personal digital assistant (PDA), a personal communicator, a gaming device, a network router or hub, a wireless access point (AP) or repeater, a set-top box, or a combination thereof.

As with the management system 168 of FIG. 1, an administrator of management system 268 may access a storage manager or controller (not shown) of storage system 264 to manage storage resources of storage system 264, such as, for example, storage space and processing resources (e.g., processor, memory, network resources). The administrator can provision and manage storage resources based on a set of policies, rules, and/or service level agreements. In some embodiments, the administrator may configure management system 268 to only allow access of storage system 264 and/or management system 268 to authorized individuals, and perform security measures, such as disabling or locking down storage system 264, management system 268, validation system 269 and/or recovery system 270), when security of the isolated environment 252 has been compromised. In some embodiments, the administrator via management system 268 may schedule performance of replication routines to ensure data are transferred or copied from one or more storage servers (e.g., storage system 104) to storage system 264 in specified intervals depending on storage requirements of the storage system 264.

Validation system 269 may perform validation checks to ensure that a link is active between storage system 104 and storage system 264. Moreover, validation system 269 may invoke data integrity validation tools to ensure incoming data from storage system 104 have not been compromised. That is, the data integrity validation tools running on validation system 269 may be leveraged to detect anomalies in the incoming data from storage system 104. In some embodiments, validation system 269 may perform integrity checks to verify that storage system 264 is unaffected by an attacker (e.g., malware or ransomware), and trigger one or more alerts in the event of a compromise.

Recovery system 270 may create and store one or more protected copies (which may be referred to as a "golden" copy) of the data stored and/or applications installed on storage system 264 to provide restore points for recovery of storage system 264. The protected copies of the data, for example, may be a read-only copy and stored in a protected region (e.g., read-only region) of a storage device of recovery system 270 and/or storage system 264 such that the protected copies cannot be modified, thereby ensuring the data integrity of the protected copies. In some embodiments, if storage system 264 is compromised (e.g., by incoming data from storage system 104), management system 268 and/or validation system 269 may disable and lock down the storage system 264. As a result, the data and applications (e.g., business critical applications) on the storage system 264 may be eradicated. Accordingly, the protected copies of the data and applications of storage system 264 may be used to restore the storage system 264.

Still referring to FIG. 2, storage system 264 may also be communicatively coupled to storage system 104 via air gap 250. Air gap 250 serves to isolate storage system 264 from an unsecured network, for example network 103 or the public Internet, in order to safeguard the integrity of the data stored on storage system 264 for the purposes of recovery. Generally, air gap 250 is deactivated, with one or more physical and/or logical ports being closed, to prevent storage system 264 from establishing an external connection with storage system 104, thereby physically isolating the storage system 264 from storage system 104, and thus, network 103. In one embodiment, at a scheduled time period (e.g., hourly, daily, weekly, monthly, etc.), air gap 250 may be activated for a predetermined time window (e.g., 15, 30 or 60 minutes) to open the physical and/or logical port(s) and establish a connection between storage system 264 and storage system 104. Accordingly, during the predetermined time window, data backup software running on storage system 104 and/or storage system 264 may trigger automatic backup or replication of data from storage 104 to storage system 264. In some embodiments, the scheduled time period and/or predetermined time window may be provided as part of backup or replication policies implemented by the administrator of management system 268. Therefore, in some embodiments management system 268 may command the storage system 264 to activate or deactivate air gap 250 based on the backup or replication policies.

Figure 3:
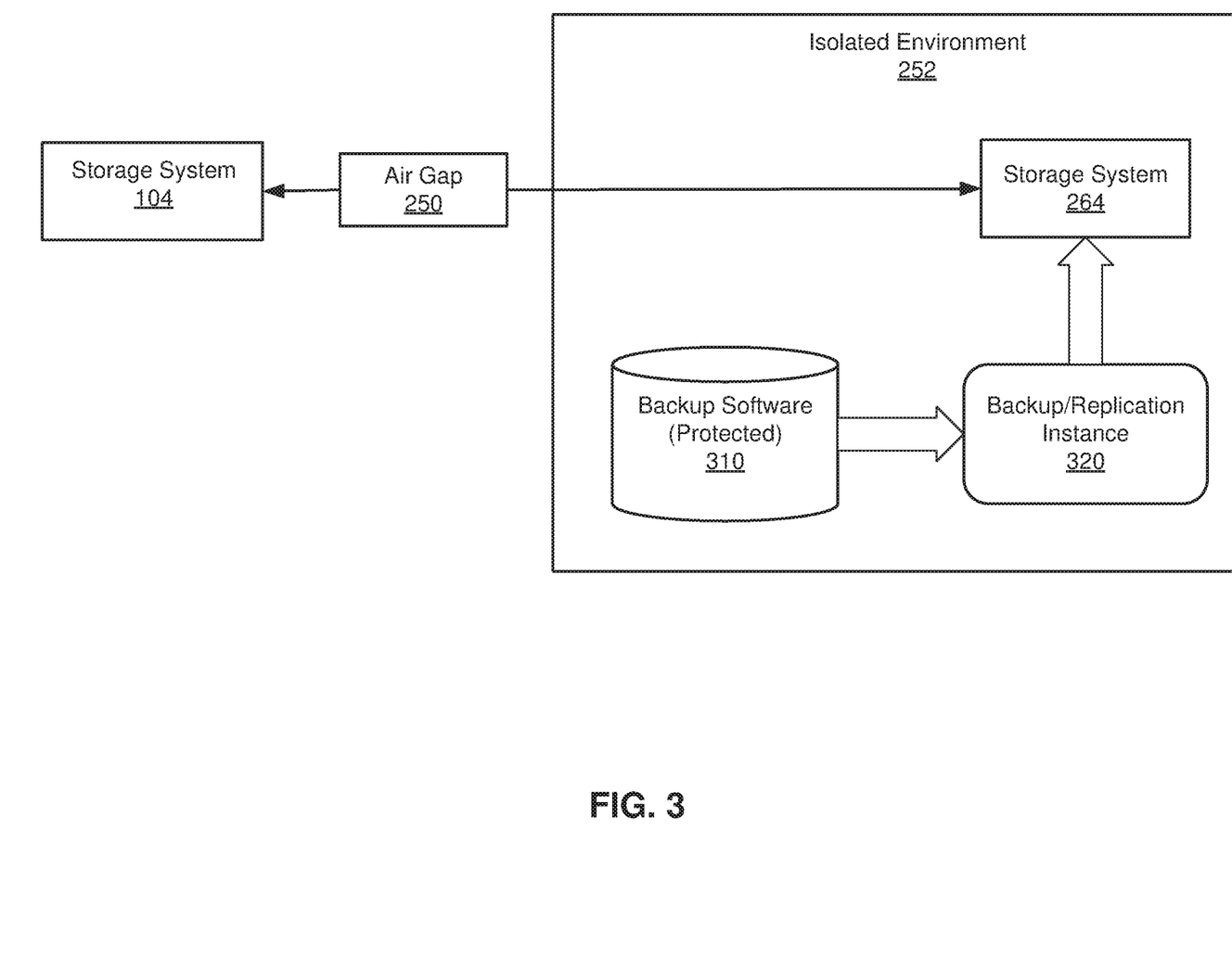
FIG. 3 is a block diagram illustrating a storage system with a software protection architecture according to one embodiment of the invention.

FIG. 3 is a block diagram illustrating a storage system with a software protection architecture according to one embodiment of the invention. Referring to FIG. 3, storage system 264 may be communicatively coupled to storage system 104 via air gap 250 (as previously described). For example, air gap 250 (when activated) may connect backup logic 121 of storage system 104 (as shown in FIG. 1) to a backup software or logic running on or coupled to storage system 264. In more detail, as illustrated in FIG. 3, the software protection architecture may include a backup software or logic 310 that is protected. For example, backup software 310 may be stored on a read-only memory (ROM), for example a non-volatile memory of storage system 264, management system 268, validation system 269 and/or recovery system 270. In some embodiments, the non-volatile memory may be an optical storage media (e.g., CD-ROM), a write once read many (WORM) device (e.g., CD-R, DVD-R), or a semiconductor-based device, such as programmable read-only memory (PROM), erasable programmable read-only memory (EPROM), and electrically programmable read-only memory (EEPROM). Accordingly, an attacker cannot modify backup software 310 without physical presence inside isolated environment 252.

In operation, when air gap 250 is activated (e.g., one or more physical and/or logical ports of air gap 250 are opened to establish a physical and/or logical connection between storage system 104 and storage system 264), a backup or replication instance 320 of backup software 310 (e.g., a new protected or read-only instance) is instantiated (or created) to connect with another backup software or logic, for example backup logic 121 of FIG. 1. In some embodiments, backup software 310 and backup logic 121 may be the same software or logic of the same or different version. After backup software 310 and backup logic 121 are connected to each other, backup logic 121 may transfer or communicate backup data (e.g., backup data from clients 101-102 of FIG. 1) from storage system 104 to storage system 264. In one embodiment, instance 320 may receive the data from storage system 104 and store the data on a storage device of storage system 264. Storage system 264 may then verify the data, and if the data passes the verification (i.e., if the data is uncompromised), storage system 264 may store or move the data to a read-only region of the storage device of storage system 264, thereby generating a protected copy of the data. In another embodiment, instance 320 may receive the data from storage system 104 and instead, store the data on an intermediate storage (e.g., a storage device of management system 268, validation system 209, or recovery system 270 of FIG. 2). In this embodiment, network 203 and/or storage system 264 may be deactivated (e.g., in a sleep or hibernation mode) and does not communicate with instance 320 while air gap 250 is activated. When air gap 250 is deactivated and instance 320 has been destroyed (as discussed in more detail herein below), network 203 and/or storage system 264 may be activated or resume operations (i.e., "awake") to receive or retrieve the data from the intermediate storage and perform verification of the data. If the data passes verification, storage system 264 may store or move the data to a protected region (e.g., read-only region) of the storage device of storage system 264, thereby generating a protected copy of the data.

In one embodiment, in instantiating instance 320 (which may be performed by backup software 310, in one embodiment), a programming object (e.g., an executable file) may be created to run on the storage system 264 and perform the backup/replication operations of backup software 310. In one embodiment, once the protected copy has been generated (i.e., data backup/replication is complete), instance 320 may be destroyed. As such, the instance 320 serves as a one-time instance that performs a single backup/replication operation of storage system 104. In one embodiment, to destroy instance 320 (which may be performed by backup software 310, in one embodiment), a destructor may be invoked to destroy the programming object that runs and performs the backup or replication operations on storage system 264, and to free (or release) the memory space occupied by the object. Alternatively or additionally, a switch may be triggered (e.g., by backup software 310) to shut off power to storage system 264. Subsequently, a new instance 320 may be created upon another activation of air gap 250. Accordingly, any security compromise of storage system 264 is not damaging as instance 320 is a protected or read-only instance and is immediately destroyed upon completion of data backup or data replication. In addition, any comprise of storage system 264 may be short lived and does not carry between different backup or replication windows. As such, incremental attacks may be eliminated.

Figure 4:
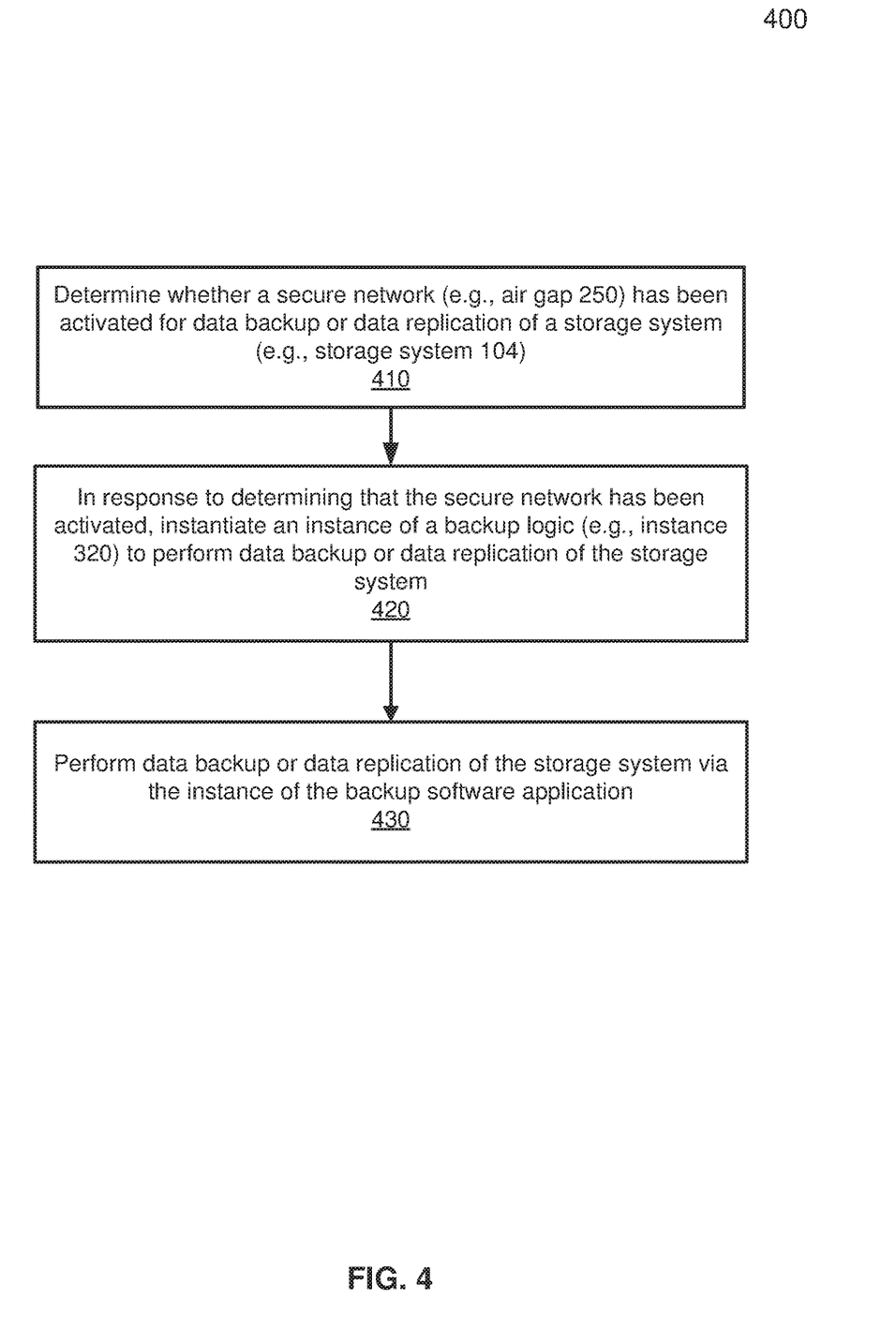
FIG. 4 is a flow diagram illustrating a method for software protection in an isolated environment according to one embodiment of the invention.

FIG. 4 is a flow diagram illustrating a method for software protection in an isolated environment (e.g., isolated environment 252) according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by storage system 264, management system 268, validation system 269, recovery system 270, or a combination thereof.

Referring to FIG. 4, at block 410, the processing logic determines whether a secure network (e.g., air gap 250 of FIG. 2) has been activated for data backup or data replication of a storage system (e.g., storage system 104 of FIG. 1). In response to determining that the secure network has been activated, at block 420, the processing logic instantiates an instance of a backup software (e.g., instance 320 of FIG. 3) to perform data backup or data replication of the storage system. At block 430, the processing logic performs the data backup or data replication of the storage system via the instance of the backup software.

Figure 5:
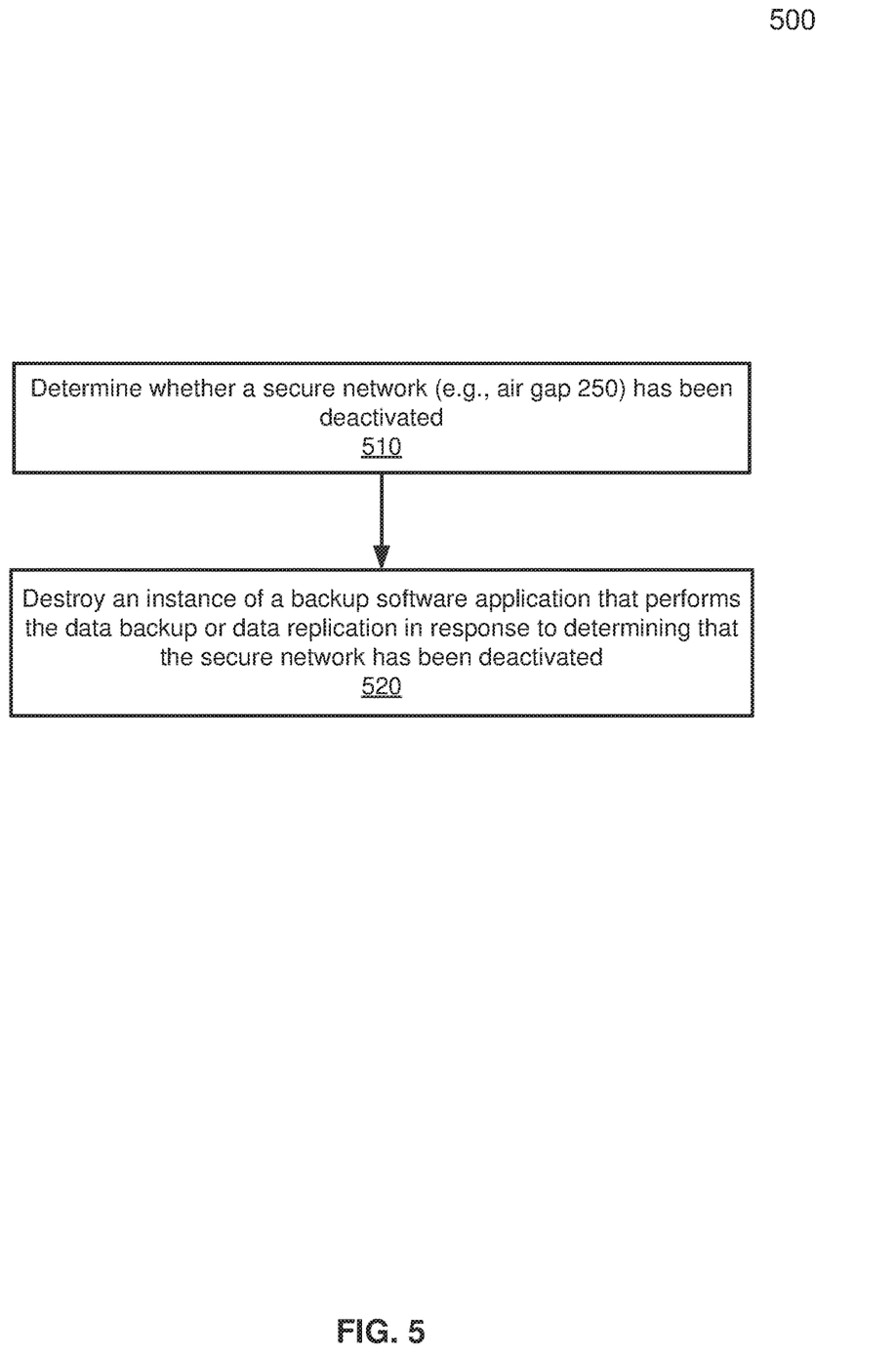
FIG. 5 is a flow diagram illustrating a further method for software protection in the isolated environment according to one embodiment of the invention.

FIG. 5 is a flow diagram illustrating a further method for software protection in the isolated environment according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by storage system 264, management system 268, validation system 269, recovery system 270, or a combination thereof. Referring to FIG. 5, at block 510, the processing logic determines whether a secure network (e.g., air gap 250) has been deactivated. To determine whether the secure network has been deactivated, in one embodiment, the processing logic may retrieve an activation status of the secure network to determine whether the secure network is deactivated. For example, the processing logic may retrieve the status(es) of one or more physical and/or logical ports associated with the secure network, with the status(es) indicating whether the ports are opened (activated) or closed (deactivated). In another embodiment, to determine whether the secure network has been deactivated, the processing logic may determine whether some or all of the data from the storage system have been backed up, replicated, or synchronized. In yet another embodiment, to determine whether the secure network has been deactivated, the processing logic may determine whether the predetermined time window, during which the secure network (e.g., air gap 250 of FIG. 2) is activated, has expired. If the predetermined time window has expired, the secure network is determined to be deactivated. Otherwise, the secure network is determined to be activated. At block 520, the processing logic destroys an instance of a backup software (e.g., backup software 310 of FIG. 3) in response to determining that the secure network has been deactivated. In doing so, in one embodiment the programming logic may invoke a destructor to destroy the instance (e.g., programming object) and free the memory space occupied by the instance.

Note that some or all of the components as shown and described above (e.g., backup module 121 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
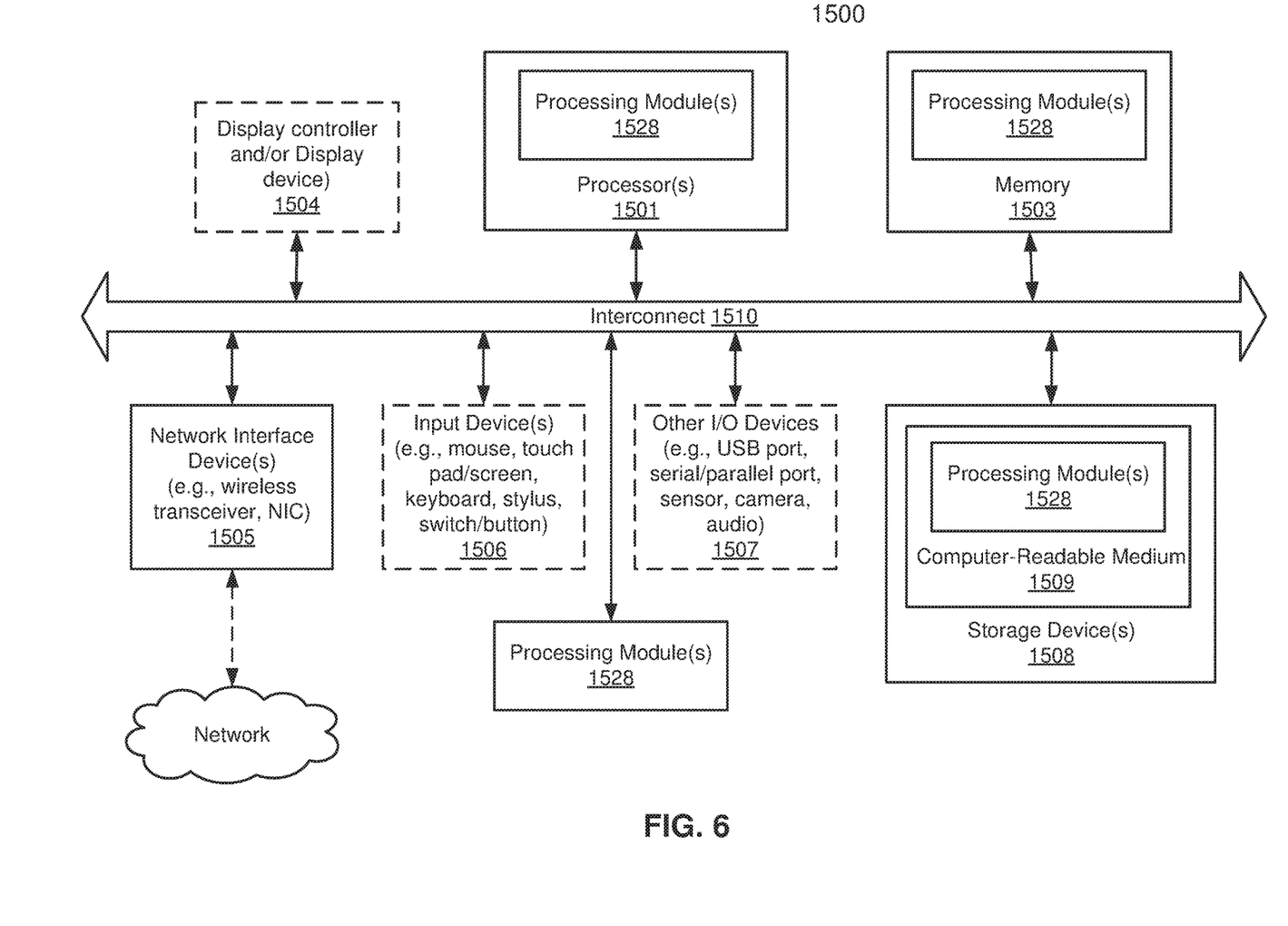
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for software protection in an isolated environment, the method comprising:
   determining whether a secure network has been activated for data backup or data replication of a storage system;
   in response to determining that the secure network has been activated, instantiating an instance of a backup software to perform the data backup or data replication of the storage system;
   performing the data backup or data replication of the storage system via the instance of the backup software;
   determining whether the secure network has been deactivated; and
   destroying the instance of the backup software in response to determining that the secure network has been deactivated.

2. The method of claim 1, further comprising:
   in response to determining that the secure network has been activated, operating in a sleep or hibernation mode;
   wherein performing the data backup or data replication of the storage system via the instance of the backup software comprises receiving, via the instance of the backup software, backup data from the storage system, and storing the backup data to an intermediate storage.

3. The method of claim 2, further comprising:
   subsequent to destroying the instance of the backup software,
   resuming from the sleep or hibernation mode,
   retrieving and verifying the backup data from the intermediate storage, and
   storing the verified data to a protected region of a storage device as a protected copy if the backup data passes the verification.

4. The method of claim 1, wherein determining whether the data backup or data replication of the storage system has been completed comprises determining whether a predetermined time window has expired, wherein the secure network is only activated during the predetermined time window.

5. The method of claim 1, wherein the backup software is stored on a read-only memory (ROM) of a system situated within the isolated environment.

6. A computer-implemented method for software protection in an isolated environment, the method comprising:
   determining whether a secure network has been activated for data backup or data replication of a storage system, wherein the secure network includes an air gap that is activated based on a scheduled time period, wherein the air gap is only activated during a predetermined time window;
   in response to determining that the secure network has been activated, instantiating an instance of a backup software to perform the data backup or data replication of the storage system; and
   performing the data backup or data replication of the storage system via the instance of the backup software.

7. A non-transitory machine-readable medium having instructions stored therein, which when executed by a processor, cause the processor to perform operations for, the operations comprising:
   determining whether a secure network has been activated for data backup or data replication of a storage system;
   in response to determining that the secure network has been activated, instantiating an instance of a backup software to perform the data backup or data replication of the storage system;
   performing the data backup or data replication of the storage system via the instance of the backup software;
   determining whether the secure network has been deactivated; and
   destroying the instance of the backup software in response to determining that the secure network has been deactivated.

8. The non-transitory machine-readable medium of claim 7, wherein the operations further comprise:
   in response to determining that the secure network has been activated, operating in a sleep or hibernation mode;
   wherein performing the data backup or data replication of the storage system via the instance of the backup software comprises receiving, via the instance of the backup software, backup data from the storage system, and storing the backup data to an intermediate storage.

9. The non-transitory machine-readable medium of claim 8, wherein the operations further comprise:
   subsequent to destroying the instance of the backup software,
      resuming from the sleep or hibernation mode,
      retrieving and verifying the backup data from the intermediate storage, and
      storing the verified data to a protected region of a storage device as a protected copy if the backup data passes the verification.

10. The non-transitory machine-readable medium of claim 7, wherein determining whether the data backup or data replication of the storage system has been completed comprises determining whether a predetermined time window has expired, wherein the secure network is only activated during the predetermined time window.

11. The non-transitory machine-readable medium of claim 7, wherein the backup software is stored on a read-only memory (ROM) of a system situated within the isolated environment.

12. A non-transitory machine-readable medium having instructions stored therein, which when executed by a processor, cause the processor to perform operations for, the operations comprising:
   determining whether a secure network has been activated for data backup or data replication of a storage system, wherein the secure network includes an air gap that is activated based on a scheduled time period, wherein the air gap is only activated during a predetermined time window;
   in response to determining that the secure network has been activated, instantiating an instance of a backup software to perform the data backup or data replication of the storage system; and
   performing the data backup or data replication of the storage system via the instance of the backup software.

13. A system comprising:
   a secure network;
   a first storage system configured to backup data from or restore data to one or more client systems;
   a second storage system communicatively coupled to the first storage system over the secure network, the second storage system comprising:
      a processor; and
      a memory coupled to the processor to store instructions, which when executed by the processor, cause the processor to perform operations, the operations comprising:
         determining whether the secure network has been activated for data backup or data replication of the first storage system;
         in response to determining that the secure network has been activated, instantiating an instance of a backup software to perform the data backup or data replication of the first storage system;
         performing the data backup or data replication of the first storage system via the instance of the backup software;
         determining whether the secure network has been deactivated; and
         destroying the instance of the backup software in response to determining that the secure network has been deactivated.

14. The system of claim 13, wherein the operations further comprise:
   in response to determining that the secure network has been activated, operating in a sleep or hibernation mode;
   wherein performing the data backup or data replication of the first storage system via the instance of the backup software comprises receiving, via the instance of the backup software, backup data from the first storage system, and storing the backup data to an intermediate storage.

15. The system of claim 14, wherein the operations further comprise:
   subsequent to destroying the instance of the backup software,
      resuming from the sleep or hibernation mode,
      retrieving and verifying the backup data from the intermediate storage, and
      storing the verified data to a protected region of a storage device of the second storage system as a protected copy if the backup data passes the verification.

16. The system of claim 13, wherein determining whether the data backup or data replication of the first storage system has been completed comprises determining whether a predetermined time window has expired, wherein the secure network is only activated during the predetermined time window.

17. The system of claim 13, wherein
   the backup software is stored on a read-only memory (ROM) of the second storage system, and
   the second storage system is situated within an isolated environment.

18. A system comprising:
   a secure network;
   a first storage system configured to backup data from or restore data to one or more client systems;
   a second storage system communicatively coupled to the first storage system over the secure network, the second storage system comprising:
      a processor; and
      a memory coupled to the processor to store instructions, which when executed by the processor, cause the processor to perform operations, the operations comprising:
         determining whether the secure network has been activated for data backup or data replication of the first storage system, wherein the secure network includes an air gap that is activated based on a scheduled time period, wherein the air gap is only activated during a predetermined time window;
         in response to determining that the secure network has been activated, instantiating an instance of a backup software to perform the data backup or data replication of the first storage system; and
         performing the data backup or data replication of the first storage system via the instance of the backup software.

* * * * *